United States Patent [19]
Sowa et al.

[11] 4,254,828
[45] Mar. 10, 1981

[54] APPARATUS FOR PRODUCING FRACTURES AND GAPS IN GEOLOGICAL FORMATIONS FOR UTILIZING THE HEAT OF THE EARTH

[75] Inventors: Armin Sowa, Ottobrunn; German Munding, Bad Friedrichshall, both of Fed. Rep. of Germany

[73] Assignee: Messerschmitt-Bölkow-Blohm GmbH, Fed. Rep. of Germany

[21] Appl. No.: 967,839

[22] Filed: Dec. 8, 1978

[30] Foreign Application Priority Data

Dec. 21, 1977 [DE] Fed. Rep. of Germany ....... 2756934

[51] Int. Cl.³ ............................................. E21B 43/26
[52] U.S. Cl. .................... 166/63; 166/299; 166/308; 166/177
[58] Field of Search .................. 166/299, 63, 308, 58, 166/59, 177, 165; 405/130; 165/45

[56] References Cited

U.S. PATENT DOCUMENTS

| | | | |
|---|---|---|---|
| 2,766,828 | 10/1956 | Rachford, Jr. ........................ | 166/299 |
| 3,561,532 | 2/1971 | Fletcher ............................... | 166/299 |
| 3,630,284 | 12/1971 | Fast et al. ............................ | 166/299 |
| 3,674,093 | 7/1972 | Reese .................................. | 166/299 |
| 3,786,858 | 1/1974 | Potter et al. ...................... | 165/45 X |
| 3,863,709 | 2/1975 | Fitch ................................. | 165/45 X |
| 3,878,884 | 4/1975 | Raleigh ............................... | 165/45 X |
| 3,938,592 | 2/1976 | Aladiev et al. ...................... | 166/299 |
| 4,030,549 | 6/1977 | Bouck ............................... | 165/45 X |

*Primary Examiner*—Stephen J. Novosad
*Attorney, Agent, or Firm*—McGlew and Tuttle

[57] ABSTRACT

A method of producing fractures or gaps in geological formations of crystalline rocks in order to utilize the heat of the earth surrounding the gaps, comprises, drilling at least one bore into the rock, producing a pressure fluid in the bore adjacent the rock by introducing pressure gas-producing propellants into the bores to a location within the rock formation and reacting the pellants after they have been sealed off from the top of the bore and discharging the fluid pressure into the bore to put the rock under a pressure above its breaking limit so as to produce a large surface gap. The apparatus advantageously comprises a pressure gas generator which operates from a monergolic propellant which is decomposed catalytically and which includes a sealing bellows arranged around a reaction chamber at the bottom of the bore which is sealed at the upper end or to the rear and is connected with the pressure gas chamber and an outlet into the forming gap having a non-return valve therein.

3 Claims, 3 Drawing Figures

4,254,828

APPARATUS FOR PRODUCING FRACTURES AND GAPS IN GEOLOGICAL FORMATIONS FOR UTILIZING THE HEAT OF THE EARTH

FIELD AND BACKGROUND OF THE INVENTION

This invention relates to earth drilling techniques in general and, in particular, to a new and useful method and apparatus for producing fractures or gaps in geological formations of crystalline rock in great depths for utilizing the heat of the earth, whereby, one or more bores are sunk into a suitable rock, which is put under a specific pressure above its breaking limit by means of a pressure medium so that a large-surface fracture or gap is formed through which a heat carrier is subsequently conducted.

DESCRIPTION OF THE PRIOR ART

According to German journal "Umschau" 1974, No. 21, pages 661 to 666, it is known to sink bores in crystalline rock formations, and to introduce a pressure medium acting on the structure of the rock with a pressure above its shearing strength through the bore, from the outside, in order to produce a fracture of relative small width, but with large surface dimensions. Relatively cold water is introduced into the ground of the fracture which has a relatively low temperature, which is, in this way, broken up thermally and widened to a "pancake-shape" gap. The water absorbs the heat of the earth in the gap, evaporates there, and then rises through another pipe to be utilized economically in a power plant. As obvious as this method of energy production, which seems practically inexhaustible, may seem theoretically, the difficulties for realizing it are very great. Thus, for example, putting the rock under pressure to produce the fracture by means of very high pressures requires the installation of a thick-walled casing of up to 4000 m length, which is very expensive, because it is not possible to conduct the high pressure through an uncased borehole extending through a sediment layer of several hundred meters thickness.

SUMMARY OF THE INVENTION

The present invention simplifies the pressurization of the corresponding rock in great depths and makes it economical. In addition, the production itself increases the effectiveness of the specific heat-exchanging capacity of the fracture or gap.

The method according to the invention is characterized in that the pressure is generated in the rock provided for this purpose, that is, at the end of a borehole or several boreholes in the rock itself. To this end, one or several pressure gas generators are installed, according to the invention, at the end of one or several bores in the rock, behind which a seal is provided during the generation of the pressure gas. The pressure gas generators may comprise, for example, combustion chambers supplied with two or more propellants (fuel and oxygen carrier) or chambers operated catalytically or charged monergolically, which are lowered through the borehole and arranged at the end of the borehole, and connected by supply hoses with storage tanks above ground.

Another possibility within the framework of the invention comprises introducing pressure gas-generating propellants through one or more boreholes or through natural fractures already existing in the rock. The pressure gas may also be produced artificially by the reaction of these propellants after they have been sealed off from the outside. The explosion or ignition of the propellants can be effected by adiabatic compression, for example. Pressure peaks of up to 7000 bar appear in the now autonomous thermal dissociation of the propellants and they act as cleavage power.

In the embodiment of the invention, a sealing bellows which seals the borehole at the rear is arranged in catalytic pressure gas generators on the circumference of a pressure gas-collecting housing. This bellows is connected with the pressure gas chamber and the outlet opening of the pressure gas collecting housing pointing to the end of the borehole which is provided with a non-return valve.

In order to enable the dissassembly of the pressure gas generator without the use of force, after a gap has been produced, a remote-controlled blowoff valve is provided for ventilating the sealing bellows.

The invention not only avoids the drawbacks of the known methods, it also achieves a more intensive fissuring of the surface of the fracture and a spreading out or branching out of the latter by the thermal shock appearing in the production of the fracture or gap, so that the heat-exchanging surface is specifically increased and improved.

Accordingly, it is an object of the invention to provide a method for producing fractures and gaps in geological formations of crystalline rock in order to utilize the heat of the earth surrounding the gaps which comprises drilling at least one bore from the ground level into the rock and producing a pressure fluid in the bore adjacent the rock and discharging the pressure fluid into the bore to put the rock under a pressure above its breaking limit so as to produce a large surface gap.

A further object of the invention is to provide an apparatus for producing a gap in a rock formation which comprises a bore having a connection to a catalyst housing with a catalyst therein as a discharge outlet and which includes a monergolic gas supply line connected into the catalyst housing for the reaction of a gas therein to produce gases under pressure which are discharged into the bore to fracture the rock.

Another object of the invention is to provide a device for producing fractures or gaps in geological formations of crystalline rock in order to utilize the heat of the earth which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
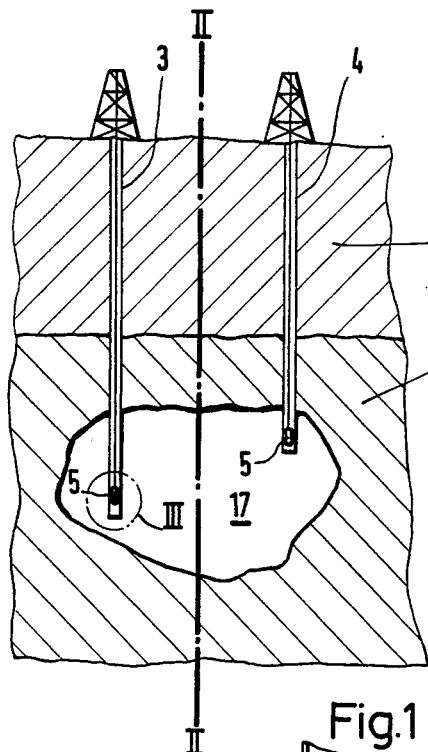
FIG. 1 is a sectional view of a borehole extending through the earth's crust down to a depth of about 4000 m and having a device for producing large gaps in a crystalline rock structure thereof in accordance with the present invention.

Referring to the drawings in particular, the invention embodied therein, comprises, an apparatus for producing enlarged gaps or cavities 17 in a crystalline rock structure 2 of an earth bore having a sediment layer 1 thereabove. In accordance with the invention, a drill pipe is extended downwardly through the sediment layer 1 and into the crystalline rock structure 2 and, at its lower end, it carries a pressure gas generator, generally designated 5, which is supplied with a monergolic gas through a supply line 16 and a check valve or injection valve 13 into a catalyst housing 6 having a catalyst 7 therein which produces a reaction of the gas to generate a gas under pressure which may be discharged through an outlet 9 having a non-return valve 10 therein to the gap 17 so as to enlarge it.

Figure 2:
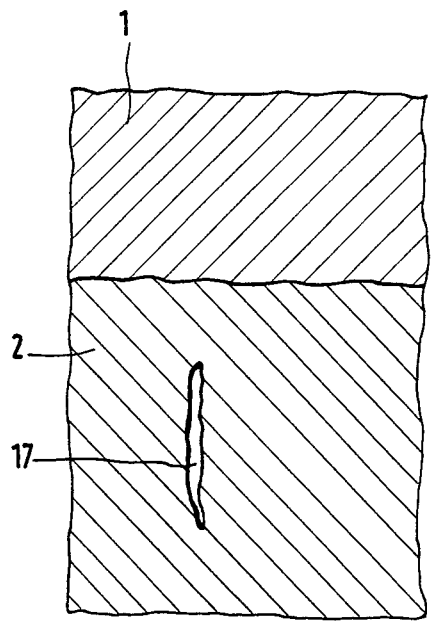
FIG. 2 is a view taken along the line II—II of FIG. 1.
Figure 3:
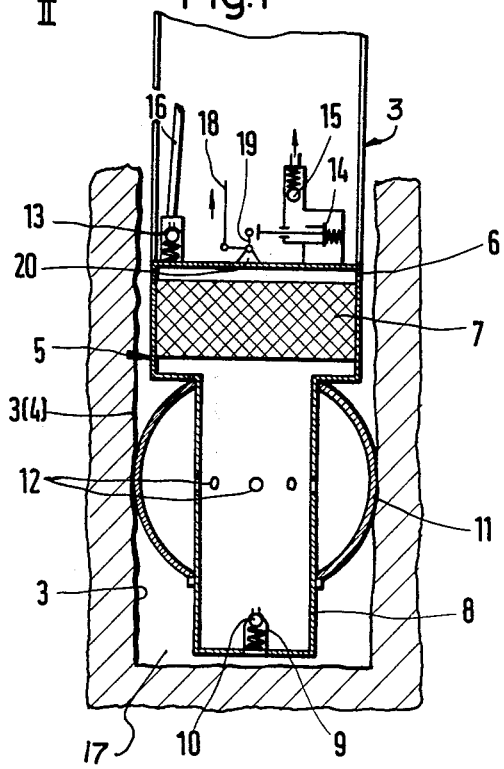
FIG. 3 is an enlarged partial, detail view of the bottom of the borepipe 3 shown in FIG. 1.

As seen in FIGS. 1 and 2, the two bores 3 and 4 are sunk from the earth's surface through the sediment layer 1 and into crystalline rock layer 2. The pressure gas generators 5 are installed at the inner or front end of the bores 3 and 4, as shown in detail in FIG. 3. Pressure gas generators 5 include a catalyst housing 6 with a catalyst 7. A pressure gas collecting housing 8 is connected to housing 6 and has an outlet opening 9 leading to the rock, which is provided with a non-return valve 10 and sealing bellows 11. The sealing bellows 11 is connected with the pressure gas collecting housing 8 through bores 12.

An injection valve 13 serves for the injection of a monergolic propellant, which is supplied through a monergolic gas supply line 16. A blowoff valve 14 and a non-return valve 15, connected to housing 16, prevent the entrance of water into pressure gas generator 5, as long as it is pressureless. Blowoff valve 14 can be remote-controlled, that is, it can be opened from the top over a tackle or control line 18 and angle lever 19, which is pivotally mounted on a block 20 secured on the housing 6.

When pressure gas generator 5 is started, a monergolic propellant is supplied through hose line 16 and injection valve 13 to the housing 6 and the catalyst 7. The catalyzer is decomposed by the propellant and pressure gas is generated with a pressure which is above the breaking strength of crystalline rock 2. The rock 2 breaks up at any point at the end of borehole 3 or 4, splitting the fracture further as pressure medium comes in, so that finally a cavity or gap 17 with increasing surface extension, but small width is formed, whose surface is greatly fissured, so that a good heat-emitting surface is later offered to the heat exchange medium traversing it.

If gap 17 has a large enough surface, the supply of propellant is stopped, and the gas pressure is drawn off from sealing bellows 11 through blowoff valve 14. Pressure gas generator 5 can then be lifted out again from bore 3 or 4.

In order to utilize the heat of the earth, water is introduced through bore 3 into the interior of the earth, after the plant is completed, to absorb heat in gap 17 at a depth of about 4000 m where a temperature of about 250° C. prevails in geological anomaly regions, to rise then rapidly through bore 4 where it is utilized.

While a specific embodiment of the invention has been shown and described in detail to illustrate the application of the principles of the invention, it will be understood that the invention may be embodied otherwise without departing from such principles.

What is claimed is:

1. An apparatus for producing large surface fractures and gaps in rock structures, comprising a bore pipe extending downwardly into the crystalline rock structure, a catalyst housing connected to the lower end of said bore pipe having a catalyst therein, a monergolic gas supply line leading into said catalyst housing, injection valve means between said supply line and said housing permitting the entrance of the gas under pressure and the sealing of the pipe line between the bore wall and the catalyst housing and a discharge valve mounted on said housing having an opening into the bore at the crystalline rock structure and being openable under pressure to permit discharge of the gases into the bore to increase the gap area.

2. An apparatus, as claimed in claim 1, including a sealing bellows arranged around said catalyst housing, said catalyst housing having at least one bore entering into said sealing bellows and blowoff valve means connected to said catalyst housing for ventilating said bellows.

3. An apparatus, as claimed in claim 2, including a remote control line connected to said blowoff valve for operating said valve.

* * * * *